United States Patent [19]

Tanahashi

[11] Patent Number: 4,466,056

[45] Date of Patent: Aug. 14, 1984

[54] ADDRESS TRANSLATION AND GENERATION SYSTEM FOR AN INFORMATION PROCESSING SYSTEM

[75] Inventor: Kenichi Tanahashi, Tokyo, Japan

[73] Assignee: Tokyo Shibaura Denki Kabushiki Kaisha, Kawasaki, Japan

[21] Appl. No.: 288,695

[22] Filed: Jul. 31, 1981

[30] Foreign Application Priority Data

Aug. 7, 1980 [JP] Japan ............................. 55-107704

[51] Int. Cl.³ ............................................. G06F 9/36
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,412,382 | 11/1968 | Couleur et al. | 364/200 |
| 3,723,976 | 3/1973 | Alvarez et al. | 364/200 |
| 3,761,881 | 9/1973 | Anderson et al. | 364/200 |
| 3,786,427 | 1/1974 | Schmidt et al. | 364/200 |
| 3,854,126 | 12/1974 | Gray et al. | 364/200 |
| 4,084,226 | 4/1978 | Anderson et al. | 364/200 |
| 4,096,573 | 6/1978 | Heller et al. | 364/200 |
| 4,128,875 | 12/1978 | Thurber et al. | 364/200 |
| 4,145,745 | 3/1979 | De Bijl et al. | 364/200 |
| 4,155,119 | 5/1979 | DeWard et al. | 364/200 |
| 4,188,662 | 2/1980 | Ishibashi | 364/200 |
| 4,218,743 | 8/1980 | Hoffman et al. | 364/200 |

FOREIGN PATENT DOCUMENTS

| | | |
|---|---|---|
| 44924 | 2/1982 | European Pat. Off. . |
| 45-2149 | 1/1970 | Japan .................................. 364/200 |
| 1221640 | 2/1971 | United Kingdom . |
| 1342459 | 1/1974 | United Kingdom . |
| 1353311 | 5/1974 | United Kingdom . |
| 1398182 | 6/1975 | United Kingdom . |
| 1459827 | 12/1976 | United Kingdom . |
| 1465344 | 2/1977 | United Kingdom . |
| 1492067 | 11/1977 | United Kingdom . |
| 2005447 | 4/1979 | United Kingdom . |
| 2008821 | 6/1979 | United Kingdom . |
| 1547382 | 6/1979 | United Kingdom . |

*Primary Examiner*—Charles E. Atkinson
*Assistant Examiner*—Mark P. Watson
*Attorney, Agent, or Firm*—Kenyon & Kenyon

[57] ABSTRACT

An address converting and generating system for an information processing system is disclosed. The address converting and generating system includes a segment type memory and an instruction having an operation code part, a field for specifying a register for loading a physical address representing a segment relative address, and a displacement for specifying a logical address. This instruction is decoded by an instruction decoder, and the physical address is generated from the logical address by referring to a segment table directory and a segment table. The generated physical address is loaded, together with a segment base address, a segment table number, and a segment table entry, in a register specified by the register specifying field. An effective address is generated by addition of the contents of the specified register and the address specified by the displacement. The system further has an instruction for generating a logical address from a physical address. When this instruction is executed, the segment base address is subtracted from the physical address. The subtraction result, the segment table number and the segment table entry are combined to provide the logical address which is loaded in the register specified by the register specifying field of the instruction.

8 Claims, 9 Drawing Figures

ADDRESS TRANSLATION AND GENERATION SYSTEM FOR AN INFORMATION PROCESSING SYSTEM

BACKGROUND OF THE INVENTION

The present invention relates to an address translation and generation system. More particularly, the present invention relates to an improved address translation and generation system which does not require an associative memory.

In a multiprogrammed system, allocation of the main memory unit is generally performed before initiating execution of a program. In the course of executing the program, dynamic relocating must sometimes be performed to relocate information stored in the main memory unit. Thus, there is no way of knowing, during programming and translating procedures, from which location of the main memory unit the program in question will be executed. For this reason, it is impossible to specify by program a particular address in the main memory unit during programming or compiling. The addresses used in programming must be allocated independently of addresses of the main memory unit. Such an address used in programming is called a logical address, and an address allocated in the main memory unit is called a physical address.

In general, the logical addresses of a program consist of consecutive addresses starting from 0. The area specified by the consecutive addresses starting from 0 is called the address space of the program. Each address thus has its own program space consisting of logical addresses which are only effective in that program. In a multiprogrammed system, a plurality of programs each having its own address space are stored in the main memory unit, and are executed simultaneously. The multiprogrammed system requires hardware for automatically converting logical addresses of the program into physical addresses. In an information processing system which adopts an addressing system which automatically converts logical addresses into physical addresses, it has been the general practice to convert a logical address into a physical address for memory access by referring to an address conversion table in the main memory unit every time an instruction is executed. When this addressing system is adopted, the address conversion table in the main memory unit must be referred to many times, resulting in a decrease in the efficiency of program execution.

An improved addressing system over such a prior art system has been proposed according to which the entries of the address conversion table which are most frequently used are stored in a high speed associative memory so as to reduce the frequency of memory access. However, with this address converting system, the address conversion table in the main memory must also be referred to in the case of entries which are not stored in the associative memory, and execution efficiency is thereby degraded. Furthermore, for effective use of the associative memory, its capacity must be increased or an efficient mechanism for storing and retrieving the contents must be adopted, increasing the cost of a medium or small scale computer and reducing its cost competitiveness. In addition to this, in the use of a so-called "virtual memory" with a conventional dynamic address converting system, when the data or an instruction required is not found in the main memory unit during execution of the instruction, execution of the instruction must be interrupted. Then, the required data or the instruction must be read into the main memory unit from an external memory unit, and thereafter the interrupted instruction may be restarted. For restarting general computer instructions which require special operations for roll-in and roll-out, after interruption of such an instruction, restarting of the interrupted instruction requires highly advanced techniques and costly systems which are imcompatible with the requirements of medium and small scale computers. For example, a technique is required for determining whether or not the data or another instruction necessary for execution of an instruction are in the main memory unit before execution of the instruction, and a technique is required which reserves or restores a number of registers within hardware for execution of the instruction.

Larger main memory units are being used as memory is becoming less expensive, and the number of physical addresses involved is correspondingly increasing. The problem of addressing the larger memory units may not be completely solved by expanding the address specifying unit for the instructions. It is considered essential to develop software based on logical addresses and to adopt a system for converting logical addresses into physical addresses. However, with the dynamic address converting system adopted in a prior art computer, logical addresses are converted into physical addresses during execution of each of the instructions. The efficient use of this system requires an expensive device such as an associative memory, and this system is not suitable for medium or small scale computers.

SUMMARY OF THE INVENTION

It is an object of the present invention to provide an address translation and generation system which eliminates the drawbacks of the prior art systems as described above, which translates a logical address into a physical address according to a particular instruction and loads this physical address in a register without requiring address translation during normal execution of an instruction since only this register is referred to; and which is less expensive and more efficient than the prior art systems.

In order to achieve this object, there is provided according to the present invention an address translation and generation system of an information processing system having a memory unit which stores a segmented program comprising instructions including first and second instructions having command fields and operand fields and which stores at least one address conversion table for translation of logical addresses into segment base addresses, and an arithmetic logic unit including an accumulator, wherein the improvement comprises:

(A) means for generating a physical address representing a segment relative address through computation of the sum of said segment base address obtained according to said address conversion table and a relative address defined by said first instruction;

(B) means for storing said physical address representing said segment relative address; and (C) means for generating an effective address through computation of the sum of said physical address stored in said means for storing and a displacement defined by said second instruction.

According to the address converting and generating system for an information processing system of the present invention, the advantages of the prior art address converting system are retained, such as the small influence exerted by the size of the main memory unit and the high-level memory protection function. Moreover, the address translation and generation system of the present invention does not require expensive devices such as an associative memory which have been required by the prior art address converting systems, and does not require conversion of a logical address into a physical address every time an instruction is to be executed, resulting in higher execution efficiency.

BRIEF DESCRIPTION OF THE DRAWINGS

Other objects and features of the present invention will be apparent from the following description taken in connection with the following drawings in which.

DETAILED DESCRIPTION OF THE PREFERRED EMBODIMENTS

Preferred embodiments of the present invention will now be described with reference to the accompanying drawings.

Figure 1:
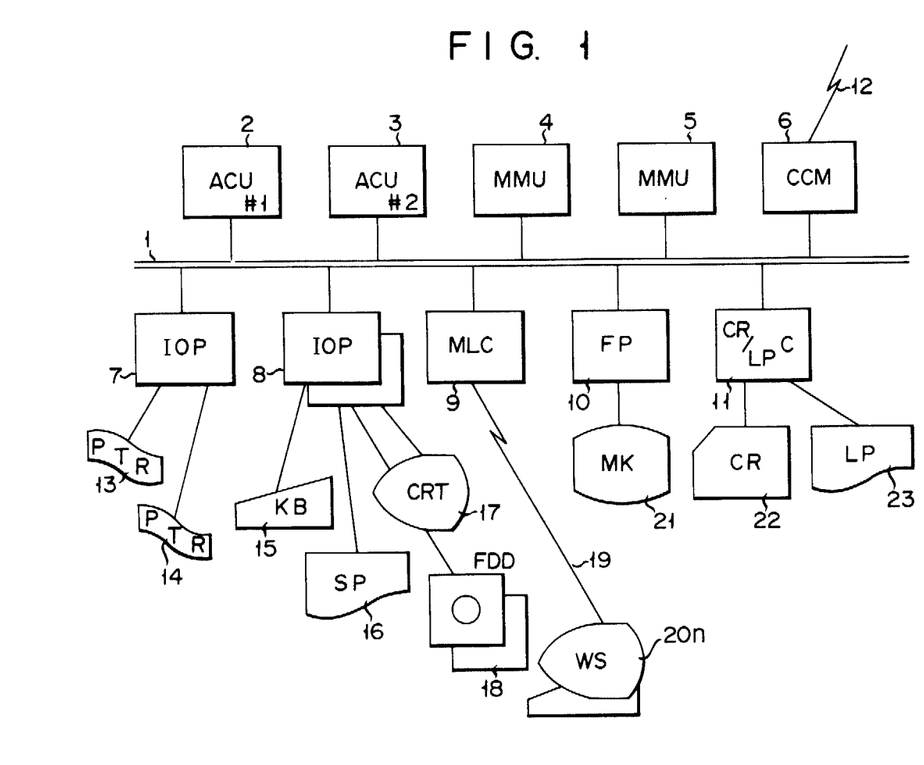
FIG. 1 is a block diagram of an information processing system which incorporates the present invention.

FIG. 1 is a block diagram of an information processing system which incorporates the present invention. Referring to FIG. 1, commonly connected to a system bus 1 are arithmetic control units (hereinafter referred to as ACU) 2 and 3, main memory units (hereinafter referred to as MMU) 4 and 5, a communication control module (hereinafter referred to as CCM) 6, input/output processing units (hereinafter referred to as IOP) 7 and 8, a multi-link controller (hereinafter referred to as MLC) 9, a file processor (hereinafter referred to as FP) 10, and an input/output control unit (hereinafter referred to as CR/LPC) 11. The ACUs 2 and 3 are the main part of the system and are of the multiprocessing type. The ACUs 2 and 3 control arithmetic and logic operation and the overall system in accordance with the programs stored in the MMUs 4 and 5. The MMUs 4 and 5 are passive modules which store programs and data and which are accessed by the respective modules connected to the system bus 1 for reading out data therefrom or for writing data therein. The CCM 6 is a module which carries out the function of communication control generally carried out by a ACU, and which controls data transmission with peripheral devices connected through a communication circuit 12. The IOPs 7 and 8 are modules which carry out the function of input/output processing also generally carried out by a ACU. The IOPs 7 and 8 control data transfer with input/output devices connected thereto such as a paper tape reader (hereinafter referred to as PTR) 13, a paper tape punch (hereinafter referred to as PTP) 14, a keyboard (hereinafter referred to as KB) 15, a serial printer (hereinafter referred to as SP) 16, a CRT display unit (hereinafter referred to as CRT) 17, and a floppy disk device (hereinafter referred to as FDD) 18. The MLC 9 controls data transfer with a plurality of work stations (hereinafter referred to as WS) 20n connected thereto through an inline (or online) circuit 19. The FP 10 controls data transfer with a magnetic disc unit (MK) 21 connected thereto. The CR/LPC 11 controls data transfer with a card reader (CR) 22 and a line printer (LP) 23.

Figure 2:
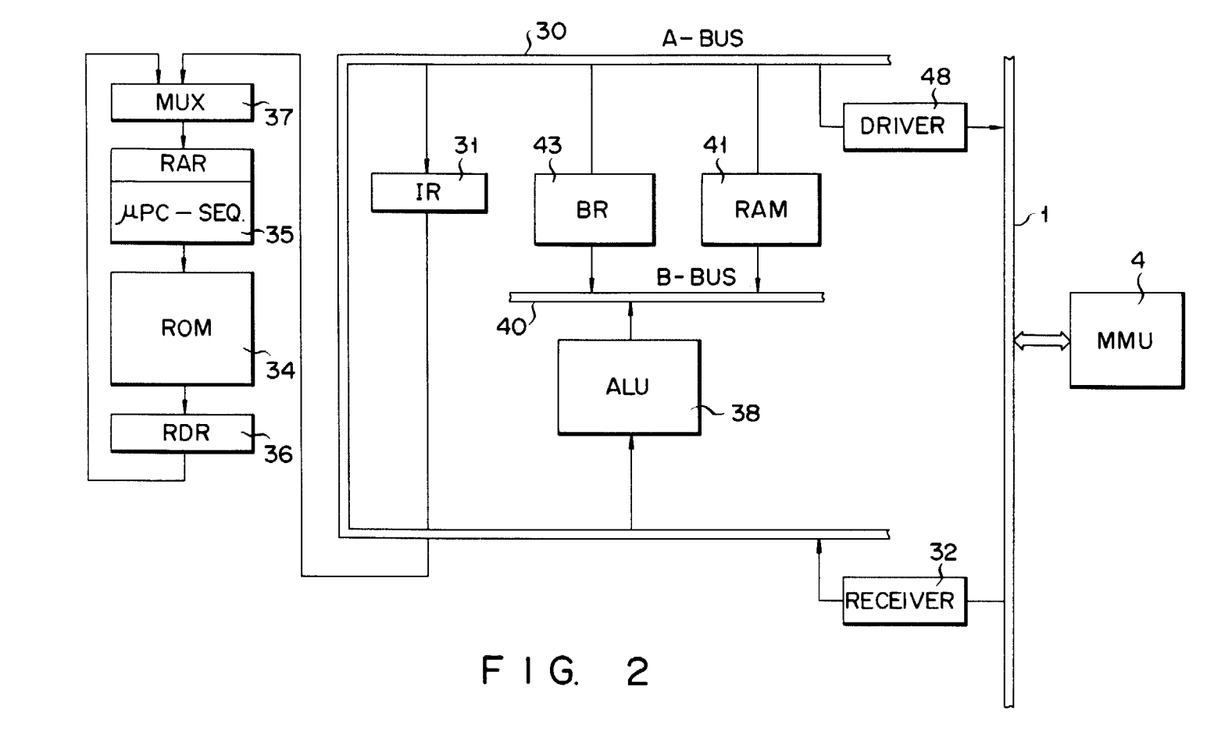
FIG. 2 is a block diagram of an arithmetic control unit of the system of FIG. 1 showing the internal construction of the arithmetic control unit.

FIG. 2 is a detailed block diagram of the ACUs 2 and 3. Referring to FIG. 2, in an instruction register 31 are loaded instructions stored in the MMUs 4 and 5 (FIG. 1) via the system bus 1, a receiver circuit 32 and an A-BUS (source bus) 30. Among the instructions stored in the instruction register 31 is, an operation code part (OP code part) which is supplied to a multiplexer 37. A read-only memory (hereinafter referred to as ROM) 34 stores microinstructions corresponding to the instructions (macroinstructions) which have been read out from the main memory unit 4. Accessing of this ROM 34 may be performed by a microprogram sequencer 35 such as an AM 2911 which is available from Advanced Micro Devices, Inc., Sunnyvale, Calif. The microinstruction read out from the ROM 34 is latched in a ROM data register (RDR) 36. Several bits of the contents latched in this RDR 36 are input to the multiplexer 37 and together with a trap address and an address which is supplied through the A-BUS 30 designate an address to the multiplixer 37. The multiplixer 37 selects the designated address which is then input to the microprogram sequencer 35 for determining the address to be accessed next.

Figure 3:
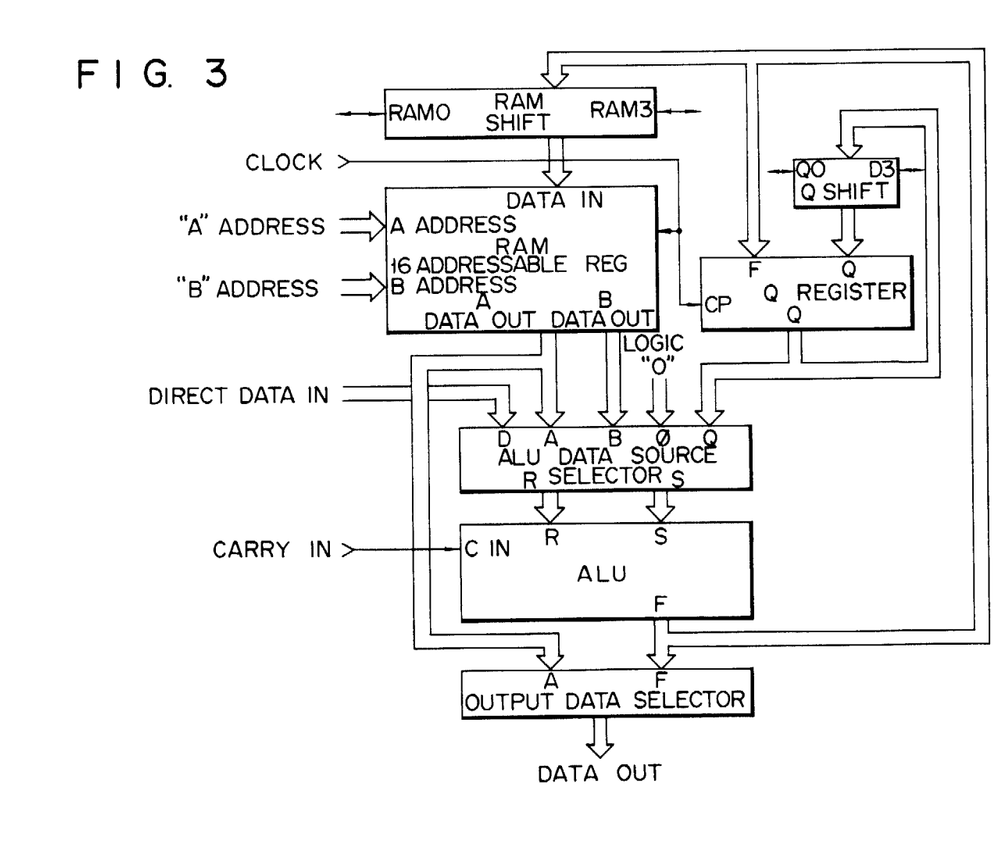
FIG. 3 is a block diagram of the arithmetic logic unit of the arithmetic control unit of FIG. 2 showing the internal construction of the arithmetic logic unit.

An arithmetic logic unit (ALU) 38 operates on the contents of a register disposed therein and external data to execute an address computation for converting a logic address into a physical address according to the microinstruction read out from the ROM 34. An AM 2901A available from Advanced Micro Devices, Inc. is suitable for use as the ALU38. Although a block diagram of the AM 2901A is shown in FIG. 3, "The AM 2900 Family Data Book" issued by Advanced Micro Devices, Inc. may be referred to for detailed operation.

A random access memory (RAM) 41 stores temporary data such as flags and so on. A group of base registers (BR) 43 is used for converting from a logical address in a physical address and vice versa. Driver circuit 48 supplies data to the system bus 1. Since these other blocks are not directly related to the present invention, further description thereof will be omitted.

Figure 4:
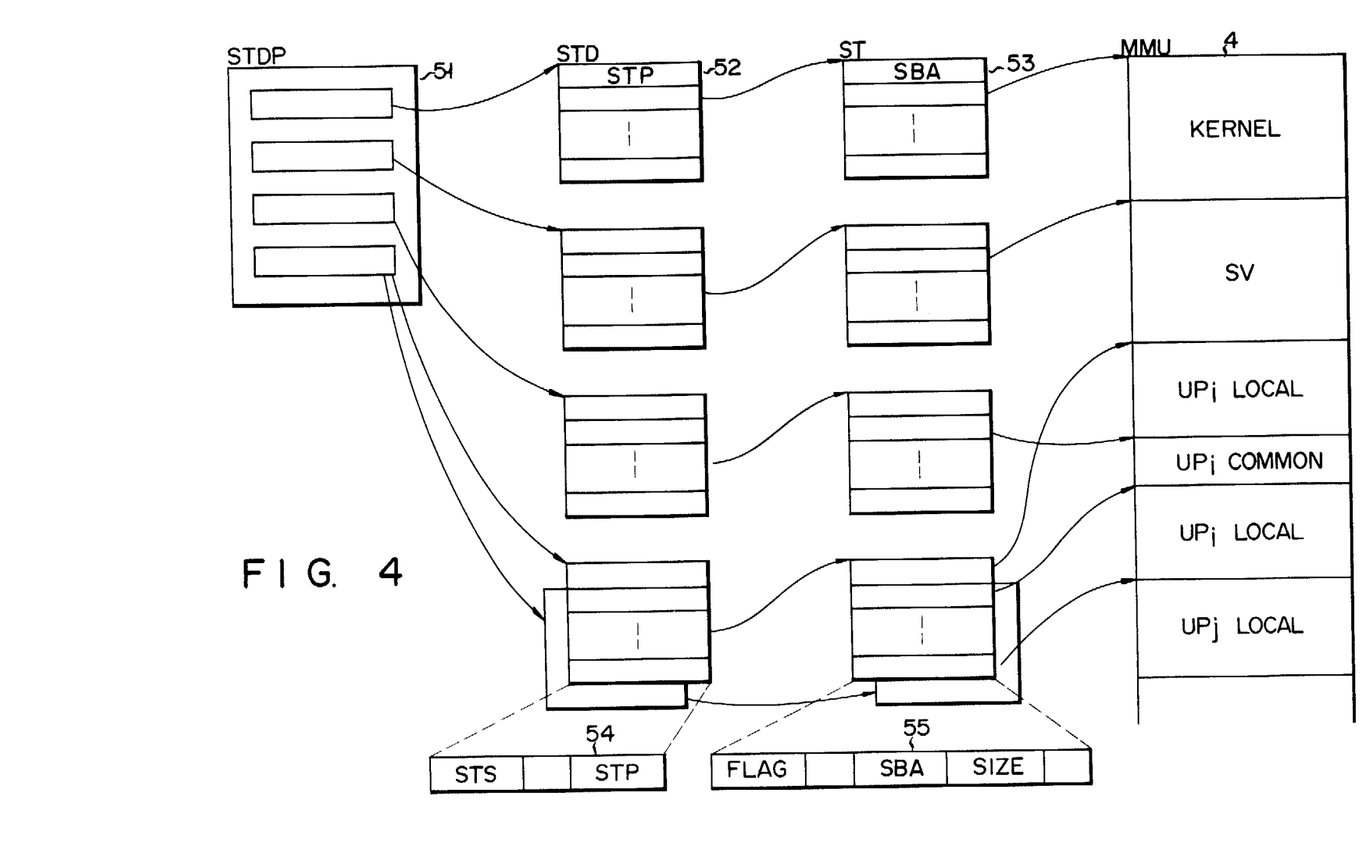
FIG. 4 is a diagram useful in illustrating operation of the present invention showing segment development of the segment system used in the address translation and generation system of the present invention and also showing segment arrangement of a main memory unit.

An information processing system incorporating the present invention adopts the segment system. FIG. 4 shows segment development and segment arrangement in the MMUs 4 and 5.

At predefined addesses of the MMUs 4 and 5 are stored segment table directory pointers (STDP) 51, segment table directories (STD) 52, and segment tables (ST) 53. The STDPs 51 indicate the start addresses of the STDs 52. As shown in format 54, the STDs 52 indicate the size (STS) and the location information (STP) of the STs 53. The respective STs 53 have segment descriptors which indicate, as shown in format 55, the attributes (FLAG), the sizes (SIZE), and the locations (SBA) in the MMUs 4 and 5 of the respective segments. A segment table number (hereinafter referred to as STN) indicates the number of the segment table and is used for determining access permission between segments. When the STN is "00", it indicates the kernel mode, in which any instruction may be executed and all locations of the MMUs 4 and 5 may be accessed, except for writing into the WRITE PROTECT area. That is, in this mode, a segment belonging to the address space of any task may be accessed. When the STN is "01", on the other hand, it indicates the supervisor mode, in which an instruction specified by a supervisor SV may be executed and a segment belonging to the address space of any task may be accessed. When the STN is "0", it indicates the program common mode, in which an instruction specified by the user program may be executed and a segment which is commonly used may be accessed. When the STN is "11", it indicates the user program local mode, in which an instruction specified by the user program may be executed. The the same. Access between the segments is determined according to the following procedure. Access is possible when $STNi \leq STNj$, and access is impossible when $STNi > STNj$, where the segment which is being executed is STNi and the segment to be accessed is STNj. With the combination of STNi=2,3 and STNj=2,3, all the segments may be accessed. This indicates that segment table numbers STN2 and STN3 have equivalent access rights. A segment table entry (hereinafter referred to as STE) indicates the entry number on the segment table, and a segment relative address (hereinafter referred to as SRA) indicates the relative address with respect to the start address of the segment.

The plurality of base registers BR 43 (FIG. 2) each comprise fields for storing physical addresses PADR, the segment table numbers STN, the segment table entries STE, and the segment base address SBA for address conversion and generation of effective addresses (base register modification). The STN is the data which indicates how many fields away the current field is from the beginning of the STD, and the STE is the data which indicates how many fields away the current field is from the beginning of the ST. According to this embodiment, the STN and STE are related as follows:

$$0 \leq STN \leq 3 \text{ and } 0 \leq STE \leq 255$$

Figure 5:
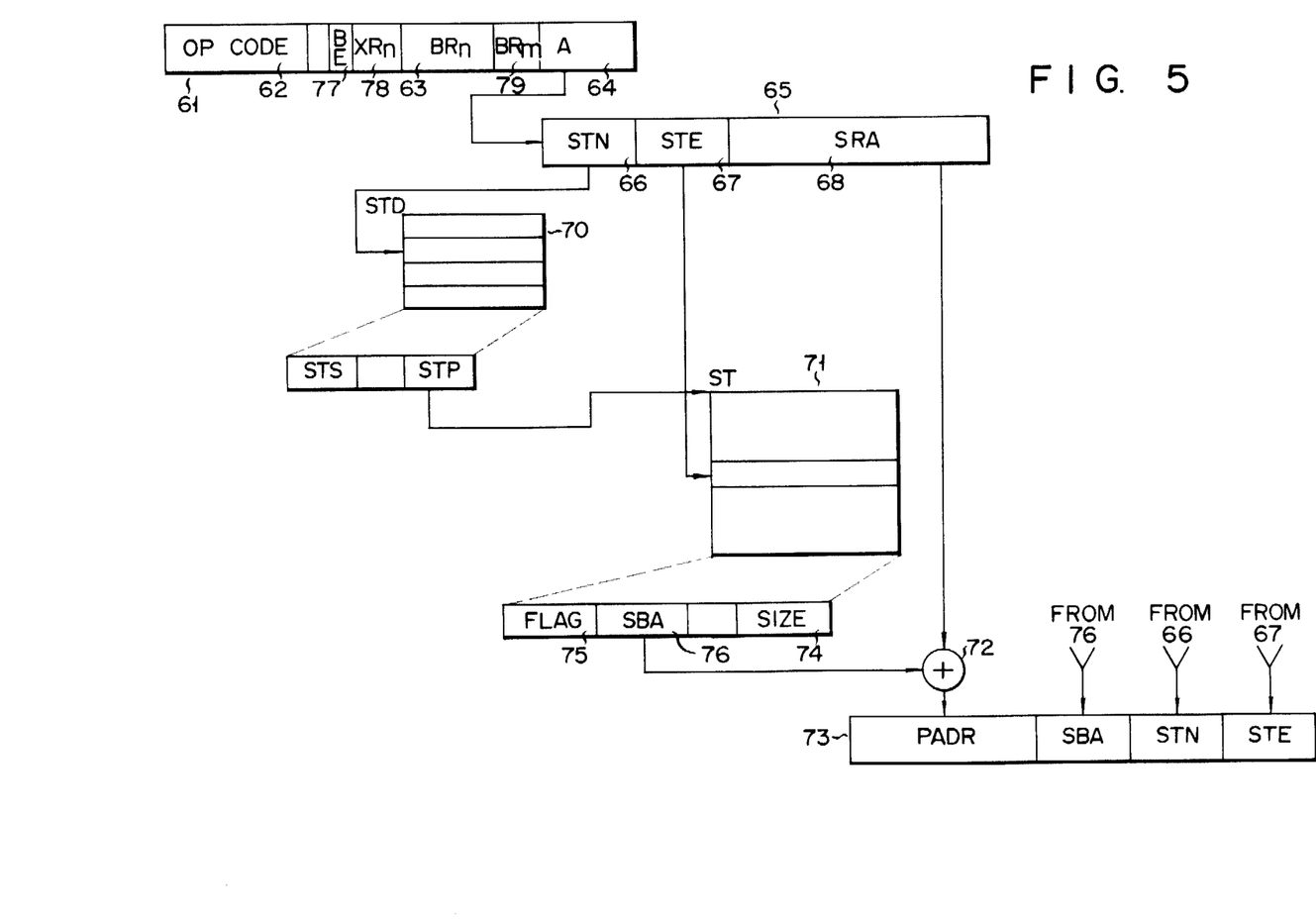
FIG. 5 is a a diagram useful in illustrating generation of a physical address in the address translation and generation system of the present invention.

The mode of operation of this embodiment will now be described in detail with reference to the diagram and flow charts of FIGS. 5 and 6. FIG. 5 shows operation of an embodiment of the address converting system (conversion from a logical address into a physical address) according to the present invention. The instruction for converting from a logical address into a physical address is called a load base register instruction (hereinafter referred to as LB instruction in which). This LB instruction refers to the segment directory table STD and the segment table ST according to the segment table number STN and the segment table entry STE specified by an address part A of the instruction, adds the segment base address SBA of a segment descriptor SD obtained thereby with the segment relative address SRA, and loads the obtained result into the base register. Referring to FIG. 5, an LB instruction 61 comprises an operation code (OP) part 62 indicating the kind of arithmetic and logic operation, a branch operation and the like, a base modification determining part (BE) 77 for determining whether the base address modification is to be effected or not, an index register specifying part (XRn) 78 for selecting the register for an index address modification, a first base register specifying part (BRn) 63 for selecting the register for storing the result processed by this instruction, a second base register specifying part (BRm) 79 for selecting the register for the base address modification and an address specifying part (A) 64 for indicating the addresses of the MMU 4 at which the logical address to be converted is stored. Although the LB instruction 61 has been described to have the above construction for the sake of simplicity, it is to be understood that it may include an index register specifying part for index modification and a base register specifying part for base modification. At the location of the MMU 4 defined by the address 65 specified by the address specifying part A are stored logical addresses STN 66, STE 67, and SRA 68 to be converted. The STN 66 and the STE 67 are entry numbers (segment numbers) necessary for address conversion, and the SRA 68 is the relative address within the segment area in the MMU 4 specified by the STE. Reference numeral 70 denotes a segment directory table which represents the location of the address conversion table in the MMU 4. The start address of an address conversion table 71 is represented by STP and its size is represented by STS. The address conversion table ST 71 consists of a number of entries, and stores data 76 on physical addresses (segment base addresses SBA) representing locations of the MMU 4, data 74 on attributes of the logical address area (segment) represented by the address conversion table entry, for example, size or data 74 representing the possibility of execution or writing. Reference numeral 72 denotes an adder for adding the segment base address SBA and the segment relative address SRA. Reference numeral 73 denotes an address register in which the sum of the SBA and SRA obtained by the addition at the adder 72 is stored as the physical address and in which are also stored the segment base address SBA, the segment table number STN, and the segment table entry STE.

The mode of operation of the address conversion system of FIG. 5 will now be described with reference to the arrangement shown in FIGS. 1 and 2. The LB instruction 61 is read out from the MMU 4 and is decoded by a decoder. The ACU 2 obtains the corresponding start address STP of the address conversion table ST and the size STS referring to the segment descriptor SD according to the STDP and STN. By further referring to the segment table ST according to the STP and STE, the segment base address SBA is obtained. The adder 72 adds the SBA and the segment relative address SRA to obtain the physical address PADR. This physical address is stored in the base register 73 specified by the base register specifying part 63 of the LB instruction 61. This register 73 also stores the segment base address SBA, the segment table number STN, and the segment table entry STE.

The mode of operation of the address translation system has thus been described. The address translation system of the present invention may include devices generally provided with a known dynamic address converting system, such as a memory protection device or a device for detecting the absence of data or instructions in the MMU corresponding to the logical addresses to be converted. The system according to the present invention may also include a device for checking the attributes of the segment of the entry of the address conversion table 71. This device may be realized by a known comparator. In addition to this processing, the ALU 38 governs, under control of microinstructions, comparison of the size of the logical address area (segment) with the segment relative address, interruption of unwanted address translation, detection of the absence of data corresponding to the specified logical address in the main memory unit, and interruption of the address translation process and setting of a corresponding flip-flop for displaying this absence. It is also possible to protect the logical address area by checking if an address translation is allowable.

Figure 6:
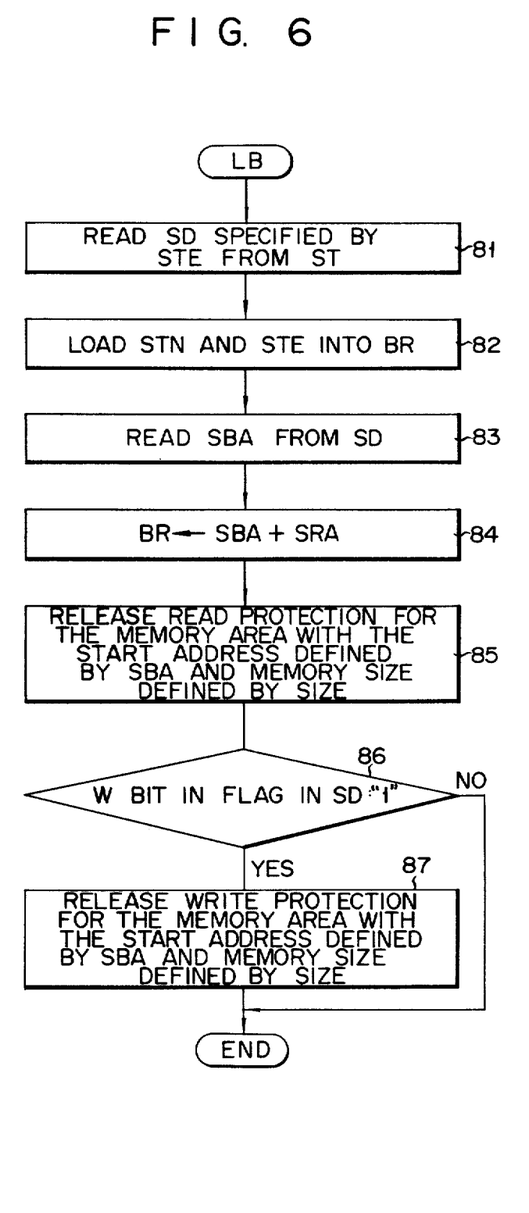
FIG. 6 is a flow chart showing operation of the invention when a particular instruction is executed according to the diagram of FIG. 5.

FIG. 6 is a flow chart showing execution of an LB instruction.

In STEP 81, the segment descriptor SD specified by the segment table entry STE from the segment table ST is read out. In STEP 82, the segment table number STN and the segment table entry STE are loaded into the base register. In STEP 83, the segment base address SBA is read out from the segment descriptor SD. In STEP 84, the result of the addition of the segment base address SBA and the segment relative address SRA is loaded in the base register BR. In STEP 85, read protection for the memory area is released for the area represented by the size information according to the address represented by the SBA.

In STEP 86, a determination is made as to whether or not a W bit of the FLAG in the segment descriptor SD is logic "1". When it is not logic "1", processing terminates. When it is logic "1", the write protection is released for the memory area allocated in STEP 85, and processing terminates.

When this LB instruction is executed, program status word (PSW), operation code (OP code), and the FLAG, SIZE and SBA of the segment descriptor SD are not affected.

Figure 7:
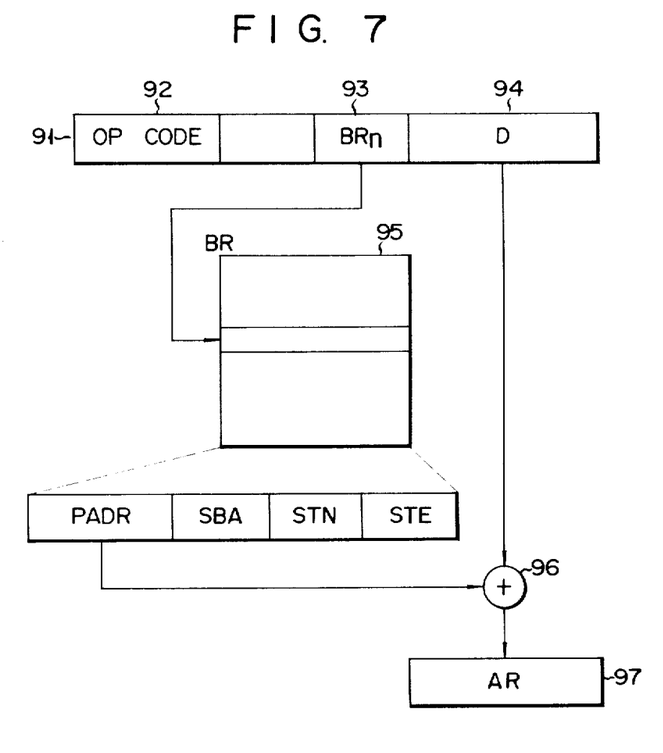
FIG. 7 is a diagram useful in illustrating generation of an effective address in the address translation and generation system of the present invention.

Generation of an effective address required for execution of a general instruction will now be described with reference to FIG. 7 which illustrates generation of an effective address utilizing a physical address converted by the address translation shown in FIG. 5. This general instruction effects base address modification for the physical address obtained in accordance with the steps shown in FIG. 6, loads the obtained effective address in the address register AR, and performs the arithmetic and logic operation specified by the OP code of the instruction for this address. Referring to FIG. 7, an instruction 91 consists of an OP code part 92, a base register specifying part 93 for base address modification, and a displacement 94. An adder 96 adds the displacement 94 of the instruction 91 with the physical address stored in the base register specified by the base register specifying part 93 of the instruction 91, and the result obtained is the effective address. The output may be supplied to an address line instead of to an address register 97. The processing specified by the OP code part 92 of the instruction is performed based on the data stored at the address of the MMU 4 indicated by the address register 97.

Figure 8:
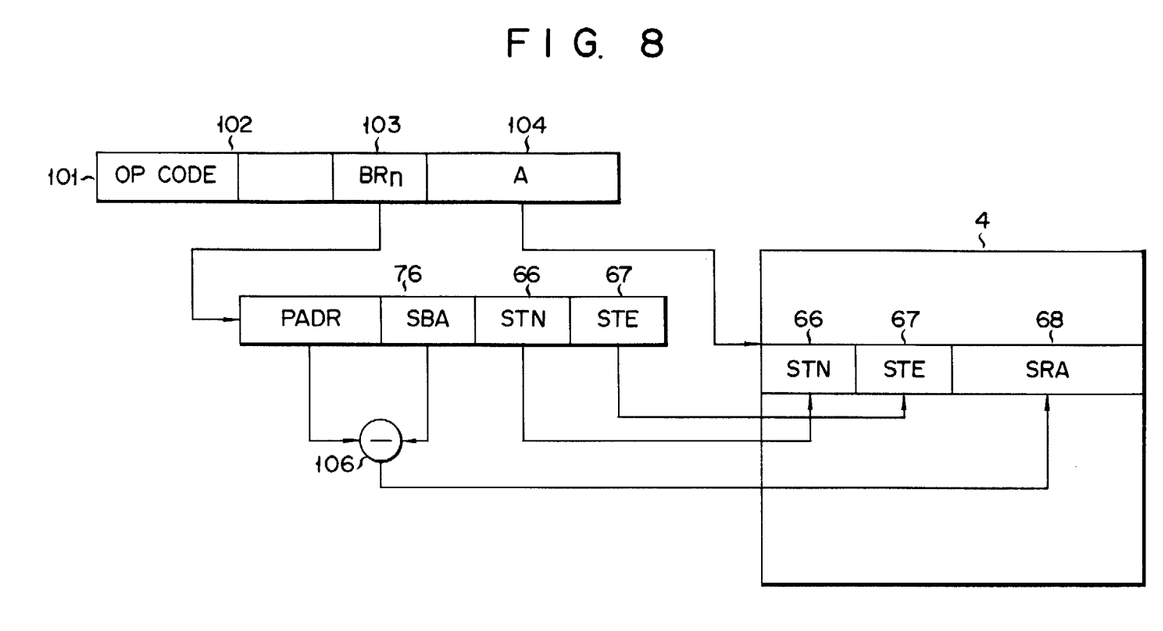
FIG. 8 is a diagram useful in illustrating generation of a logical address in the address translation and generation mechanism of the present invention.
Figure 9:
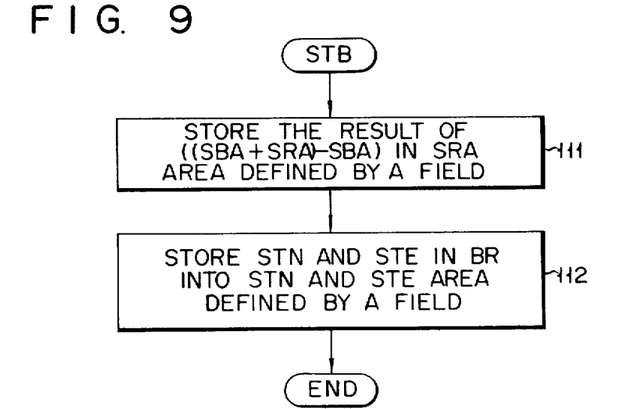
FIG. 9 is a flow chart showing operation of the invention when a particular instruction is executed according to the diagram of FIG. 8.

The software only involves logical addresses without involving physical addresses. For this reason, when saving the contents of the base register, the physical addresses which have been involved in the operation must be reconverted to logical addresses and must be saved. A system for retranslating a physical address into a logic address to be used for this purpose will now be described with reference to FIG. 8. FIG. 8 shows an embodiment of a retranslation system and its operation (for converting a logical address into a physical address) according to the present invention operation of this retranslation instruction. In FIG. 8, reference numeral 101 denotes a store base register instruction (hereinafter referred to as STB instruction) for retranslation from a physical address into a logical address and for storing the result in a specified base register. The STB instruction 101 comprises an operation code (OP) part 102, a base register part 103 for specifying the base register for storing the physical address to be retranslated, and an address specifying part A, denoted by 104. Reference numeral 73 denotes the base register specified by the base register specifying part 103 of the STB instruction 101. In this base register 73 are stored the physical address PADR to be retranslated, the segment base address SBA, the segment table number STN, and the segment table entry STE. Reference numeral 106 denotes a subtractor. As shown in STEP 111 of FIG. 9, the segment base address SBA is subtracted from the physical address PADR in the base register at the subtractor 106. As a result of this subtraction, the segment relative address SRA is obtained which is stored in the particular area of the MMU 4 specified by the address specifying part 104 of the instruction 101. Then, as shown in STEP 112 of FIG. 9, the segment table number STN and the segment table entry STE in the base register 73 are stored in this particluar area. Consequently, the logical address is re-stores in the specified memory area.

What is claimed is:

1. In an information processing system including an address translation and generation system, a memory unit in which is stored a segmented program comprising instructions including first and second instructions and in which is stored at least one address conversion table used for converting logical addresses into segment base addresses, and an arithmetic logic unit including an accumulator, the improvement comprising:
    (A) means for generating a physical address through addition of a segment base address and a segment relative address, the segment base address being obtained by address conversion from a logical address to be converted specified directly or indirectly by a field of said first instruction, said segment relative address being specified by a field of said first instruction, and the addition being specified by an op code of said first instruction;
    (B) a register specified by a field of said first instruction for storing said physical address and
    (C) means for generating an effective address through addition of said physical address stored in said register and a displacement specified by a displacement field of said second instruction.

2. In the information processing system according to claim 1, the improvement further comprising:

means for storing a physical address to be converted to a logical address and for storing a segment base address, said means for storing said physical address and said segment base address being specified by a field of a further instruction, means for effecting an arithmetic operation of said physical address and said segment base address stored in said means for storing, and means for translating said physical address into a logical address by storing the result of said arithmetic operation and part of said logical address in a memory location of said memory unit specified by an address field of said further instruction.

3. In the information processing system according to claim 2, the improvement further comprising said means for effecting and said means for translating comprising said arithmetic logic unit.

4. In the information processing system according to claim 2, the improvement further comprising said means for storing said physical address and said segment base address comprising a base register specified by a register field of said further instruction.

5. In the information processing system according to claim 1, the improvement further comprising said means for generating a physical address and said means for generating an effective address comprising said arithmetic logic unit.

6. In the information processing system according to claim 1, the improvement further comprising means for base modifying said logical address in accordance with a base modification field in said first instruction and for index modifying said logical address in accordance with an index modification field in said first instruction.

7. In a segment-type information processing system using a segmented address space including an address translation and generation system, a main memory unit, a plurality of base registers, an arithmetic logic unit, an instruction register coupled to said main memory unit by a bus for storing an instruction read out from said main memory unit, and instruction decoding and controlling means coupled to said instruction register for decoding an instruction stored in said instruction register and for outputting microinstructions in dependence on the instruction stored in the instruction register, the improvement comprising:

said arithmetic logic unit generating physical addresses from logical addresses stored in the main memory unit in response to microinstructions output from said instruction decoding and controlling means in dependence on the instruction stored in said instruction register;

said arithmetic logic unit in response to said microinstructions:

generating a segment base address from a logical address which is stored in the main memory unit at an address location specified by an address specifying field of the instruction stored in said instruction register;

executing an operation specified in an operation code field of the instruction stored in said instruction register involving said segment base address and said logical address to obtain a physical address; and storing said physical address in a base register specified by a base register field of the instruction stored in said instruction register.

8. In the information processing system according to claim 7, the improvement further comprising said arithmetic logic unit in response to further microinstructions output from said instruction decoding and controlling means in dependence on a further instruction stored in said instruction register, generating a logical address from a physical address, said arithmetic logic unit in response to said further microinstructions:

executing an operation specified in an operation code field of said further instruction involving a physical address stored in a base register specified in a base register specifying field of said further instruction and a segment base address stored in said base register to obtain a logical address; and storing said logical address in the main memory unit at a location specified by an address specifying field of said further instruction.

* * * * *